(12) United States Patent
El-Aini et al.

(10) Patent No.: US 8,002,286 B1
(45) Date of Patent: Aug. 23, 2011

(54) AERODYNAMICALLY MISTUNED LABYRINTH SEAL

(75) Inventors: Yehia El-Aini, Tequesta, FL (US); George J Obranic, Jr., Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/839,018

(22) Filed: Jul. 19, 2010

Related U.S. Application Data

(63) Continuation-in-part of application No. 12/815,063, filed on Jun. 14, 2010.

(51) Int. Cl.
*F16J 15/447* (2006.01)
(52) U.S. Cl. ...................................................... 277/412
(58) Field of Classification Search .................. 277/412, 277/417–418, 424
See application file for complete search history.

(56) References Cited

U.S. PATENT DOCUMENTS

| | | | | |
|---|---|---|---|---|
| 2,245,281 A * | 6/1941 | Klopak | | 277/419 |
| 5,024,451 A * | 6/1991 | Borowski | | 277/412 |
| 5,427,387 A * | 6/1995 | Johnston | | 277/559 |
| 6,394,459 B1 * | 5/2002 | Florin | | 277/303 |
| 7,445,213 B1 * | 11/2008 | Pelfrey | | 277/418 |
| 7,857,581 B2 * | 12/2010 | Mons et al. | | 415/173.5 |

* cited by examiner

*Primary Examiner* — Vishal Patel
(74) *Attorney, Agent, or Firm* — John Ryznic

(57) ABSTRACT

A labyrinth seal having two or more knife edges in which at least one of the knife edges has a varying radial height in the circumferential direction or a cavity formed between adjacent knife edges has a varying axial width so that the leakage flow across the gap will vary around the circumference in order that excess vibrations will not develop in the knife edges and break them. The radial height of the step that forms a gap with the lab teeth varies either sinusoidal or random. An axial spacing between the step and the associated tooth can also vary either sinusoidal or random. To minimize a cavity edgetone effect, the corners of the steps are rounded.

3 Claims, 5 Drawing Sheets

AERODYNAMICALLY MISTUNED LABYRINTH SEAL

CROSS-REFERENCE TO RELATED APPLICATIONS

This application is a CONTINUATION-IN-PART of U.S. Regular patent application Ser. No. 12/815,063 filed on Jun. 14, 2010 and entitled AERODYNAMICALLY MISTUNED LABYRINTH SEAL.

GOVERNMENT LICENSE RIGHTS

None.

BACKGROUND OF THE INVENTION

1. Field of the Invention

The present invention relates generally to a turbomachine, and more specifically for a labyrinth seal in a turbomachine.

2. Description of the Related Art Including Information Disclosed Under 37 CFR 1.97 and 1.98

A labyrinth seal is a mechanical seal that fits around an axle to prevent the leakage of oil or other fluids. A labyrinth seal is composed of many straight grooves that press tightly inside another axle, or inside a hole, so that the fluid has to pass through a long and difficult path to escape. Sometimes screw threads exist on the outer and inner portion. These interlock, to produce the long characteristic path which slows leakage. For labyrinth seals on a rotating shaft, a very small clearance must exist between the tips of the labyrinth threads and the running surface.

Turbines use labyrinth seals due to the lack of friction, which is necessary for high rotational speeds. Labyrinth seals are used in turbo-machinery designs to control internal flow leakage and maintain desired pressures for internal cavities. A labyrinth seal typically includes two or more teeth or knife edges that form a seal with an opposed surface. In some labyrinth seals, the knife edges rotate while in other labyrinth seals the knife edges are stationary.

On occasions, labyrinth seals experience high cycle fatigue (HCF) due to resonance, coincidence and flutter instability. The fluid leakage across the gaps of the knife edges will induce vibrations within the teeth and cause them to break off. Common design fixes to prevent vibrations of labyrinth seals is to add damping. However, that may not be possible for a stationary seal, should a split-ring damper be used.

BRIEF SUMMARY OF THE INVENTION

A labyrinth seal for a turbo-machine, the labyrinth seal having a plurality of teeth that are either rotating or non-rotating, in which the teeth on each row has a varying radial height so that the tooth gap changes in a circumferential direction for each tooth in the labyrinth seal. This non-uniform radial gap will produce varying circumferential and axial velocities of the fluid leakage which will impact the Helmholtz and diameteral acoustic modes and prevent possible sustained resonance with the knife edges of the labyrinth seal.

In another embodiment of the labyrinth seal of the present invention, a non-uniform knife edge to knife edge spacing is used. This design will affect the axial spacing between adjacent knife edges in the labyrinth seal which in turn affects the edge-tone frequency. This circumferential variation will prevent a lock of an acoustic mode to structural modes.

In another embodiment, of the labyrinth seal, the knife edges have a constant radial height, but the upstream-most knife edge has a forward edge at the tip that has a varying radius of curvature such that the flow rate across the gap also varies around the circumferential direction of the knife edge.

In all of these embodiments, the unsteady pressure in the seal cavities will be composed of high number of harmonics with varying phase with the seal vibratory motion. The lack of phase lock between the unsteady pressure and the vibratory mode shape will prevent the labyrinth seal from fluttering, which causes the teeth to break.

In another embodiment, the same variation in knife edge radial height or cavity spacing can be applied to a brush seal arrangement with two or more rows of brush seals.

In another embodiment, a stepped labyrinth seal is used with the varying height or width formed in the individual steps of the rotor. The height of the steps can vary either sinusoidal or random, or the axial length of the steps can vary either sinusoidal or random. Also, the steps can have rounded corners such that the edge-tone phenomenon will be reduced resulting in minimal interaction between the rotor and the stator of the seal.

DETAILED DESCRIPTION OF THE INVENTION

Figure 1:
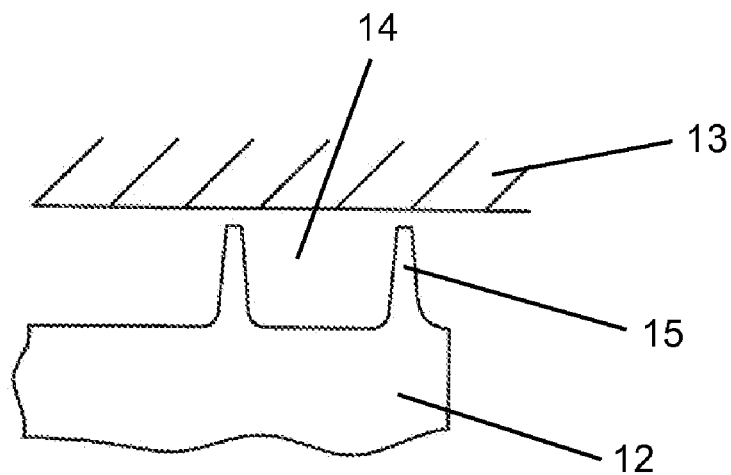
FIG. 1 shows a cross section view of a labyrinth seal assembly of the present invention.
Figure 2:
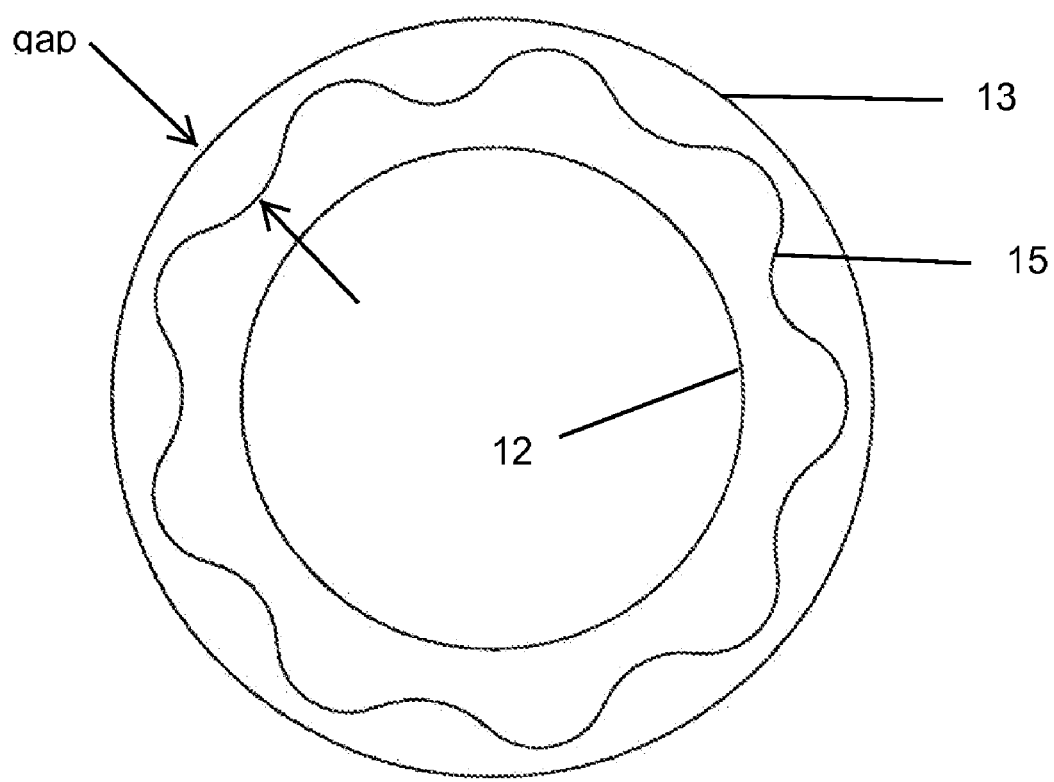
FIG. 2 shows a cross section view along the rotational axis of the labyrinth seal of FIG. 1.

A labyrinth seal for a turbomachine is shown in FIGS. 1 and 2 and includes a stator 12 with two or more rows of knife edges or teeth 15 that extend toward a rotor 13 to form a radial gap ($\ominus$) between a top surface of the knife edge and the inner surface of the rotor 13. In other embodiments, the knife edges can extend from the rotor with the stator forming the other end of the gap. Adjacent knife edges 15 form a cavity 14. The leakage flow across the labyrinth seal is shown by the arrow in FIG. 1. The differences between the prior art labyrinth seal and the present invention of FIG. 2 is that the upstream knife edge 15 has a varying radial height so that the knife edge radial gap also varies along the circumferential direction of the labyrinth seal. FIG. 2 shows a full annular view of the knife edge gap around the labyrinth seal with the arrows showing the gap ($\ominus$) between the rotor 13 surface and the forward or upstream knife edge 15. In another embodiment, the second downstream knife edge could also have a varying radial height as a function of the circumferential position. The varying radial height of one knife edge row will not coincide with the varying radial height of the adjacent knife edge row so that the gap spacing is not the same in the circumferential direction. The varying radial gap of the labyrinth seal will produce a variable flow rate across the gap in the circumferential direction of the knife edge. In other words, the flow across the gap varies along the circumferential position.

Figure 3:
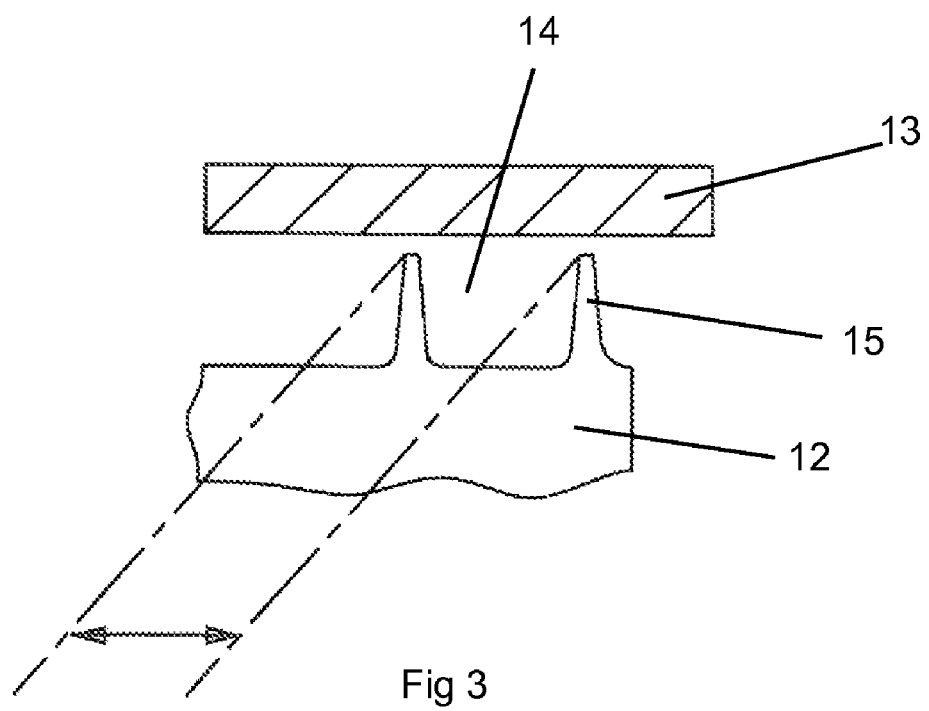
FIG. 3 shows a cross section view of a labyrinth assembly of a second embodiment of the present invention.
Figure 4:
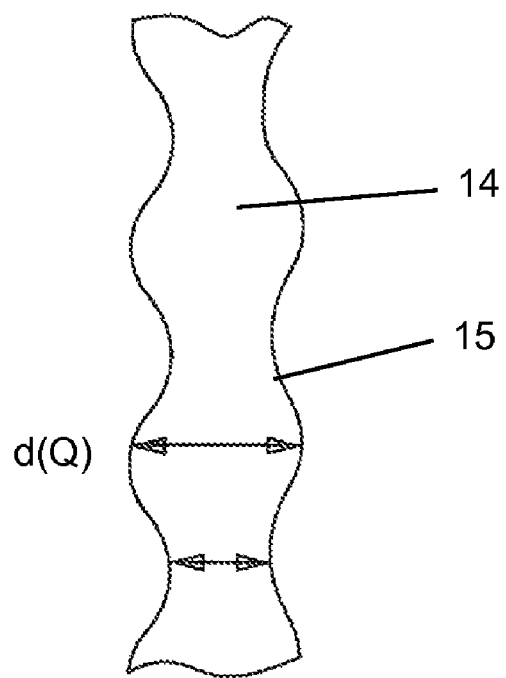
FIG. 4 shows a cross section view of the labyrinth seal of FIG. 4 from a top view looking into the labyrinth cavity.

Another embodiment of a labyrinth seal of the present invention is shown in FIGS. 3 and 4 in which the axial spacing between adjacent labyrinth seal knife edges is varied instead of the radial height of the knife edge. In the FIG. 4 embodiment, the adjacent knife edges have the same radial height. However, the knife edge sides have a varying width across the cavity formed between two adjacent knife edges. One or both of the knife edge sides can be contoured such that the cavity width $d(\Theta)$ (represented in FIGS. 3 and 4 as d(Q)) has a varying width in the circumferential direction of the knife edges and cavity. The adjacent knife edges are not in phase in the circumferential direction to ensure a variation in the axial spacing. This will cause the edge-tone vortex shedding to have a wide range of harmonics and thus reducing the potential of phase lock with the vibrating modes.

Figure 5:
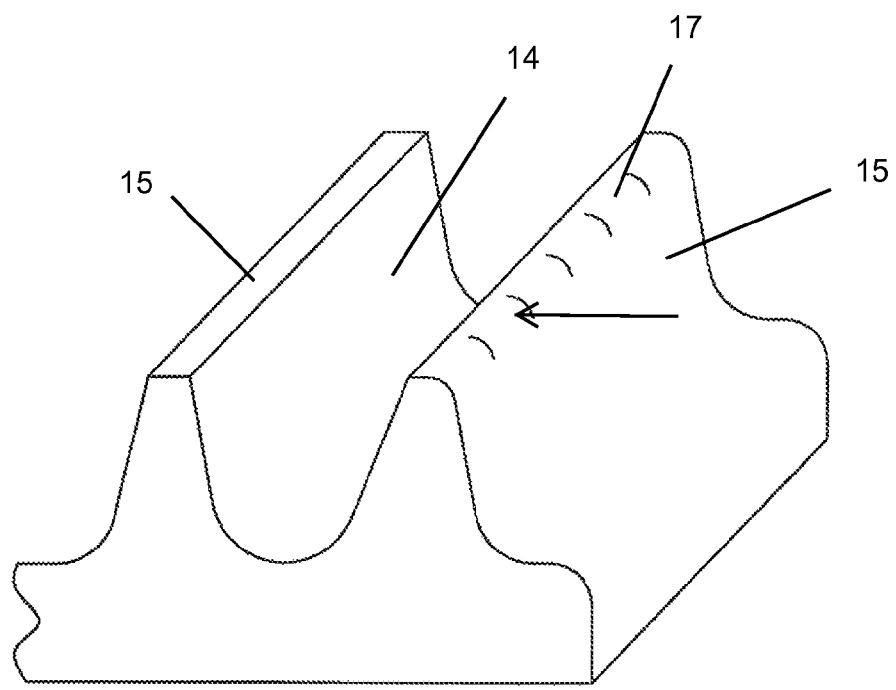
FIG. 5 shows a cross section view of a labyrinth seal of a third embodiment of the present invention.

FIG. 5 shows another embodiment of the labyrinth seal of the present invention in which the flow rate of leakage across the gap varies around the circumferential direction of the knife edge or edges. Instead of varying the radial height of the knife edge or the axial width in the cavity, the forward or upstream edge of the knife edge tip 17 has a varying radius of curvature along the circumference of the seal. This varying radius of curvature can be random or sinusoidal and will result in circumferential variation of the shedding frequencies that inhibits phase lock.

Figure 6:
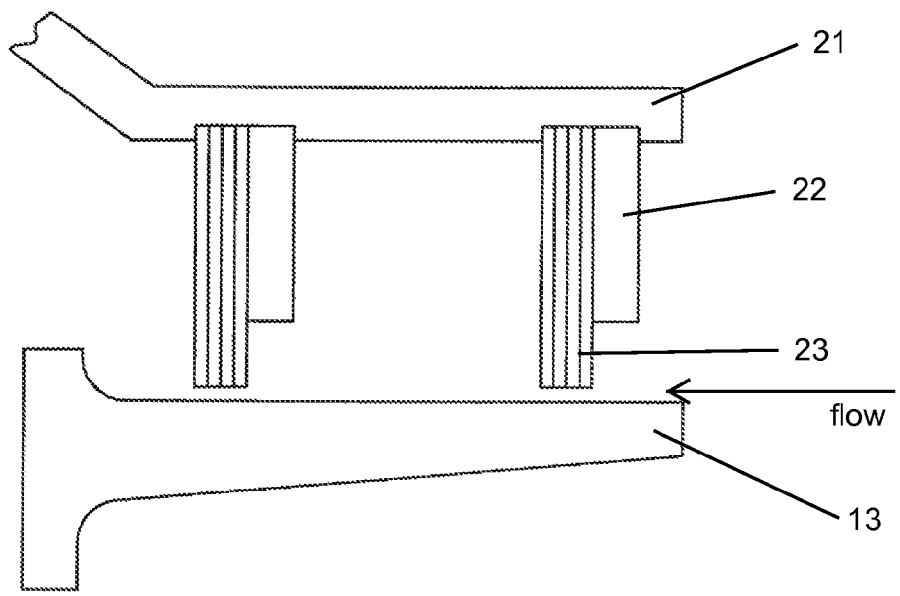
FIG. 6 shows a cross section view of a brush seal of the present invention that uses the varying radial height.

FIG. 6 shows the concept of the present invention applied to a brush seal. Two brush seal 23, each supported by a back plate 22, extend from a stator 21 and form a gap with a rotor 13. The two brush seals have a varying axial spacing between adjacent brush seals. In the FIG. 6 embodiment, one or both of the brush seals can have the brushes that form the varying axial spacing between adjacent brushes in the brush seal that will produce similar varying leakage flow and shedding frequencies across the brush seals.

In the various embodiments of the labyrinth seal or the brush seal of the present invention, the knife edge with a varying radial height can be formed on a rotating labyrinth seal or a stationary labyrinth seal. Also, the labyrinth seal with the varying axial spacing can be formed on a rotating labyrinth seal or a stationary labyrinth seal. Also, a combination of the labyrinth seal with a varying radial height and a varying axial spacing could also be used. Also, in each embodiment, the geometric variations of the radial height or the axial spacing along the seal circumference could be sinusoidal or random. A minimum of two adjacent knife edges should be used for the varying radial height and the varying axial spacing. The different embodiments of the present invention can be produced by starting with a conventional labyrinth seal assembly in which all of the knife edges have the same radial height and the cavity widths are constant, and then the knife edge or edges can be machined to produce the various radial heights and/or the various cavity widths.

For the embodiment with the various cavity widths, the inner side wall of one or both of the knife edges can be machined using an EDM (electric discharge machining) process to cut away the knife edge material in order to produce the random or sinusoidal shaped side. For the embodiment with the varying radial height, a standard machining process using a metal cutting tool can be used. The embodiments of the present invention can be produced on an already unstable labyrinth seal (the prior art labyrinth seals) by machining onto the knife edge or edges the varying heights or widths so that the prior art problem of knife edge breakage can be eliminated. The labyrinth seal with the varying radial or axial spacing can also be used on a stepped labyrinth seal.

Figure 7:
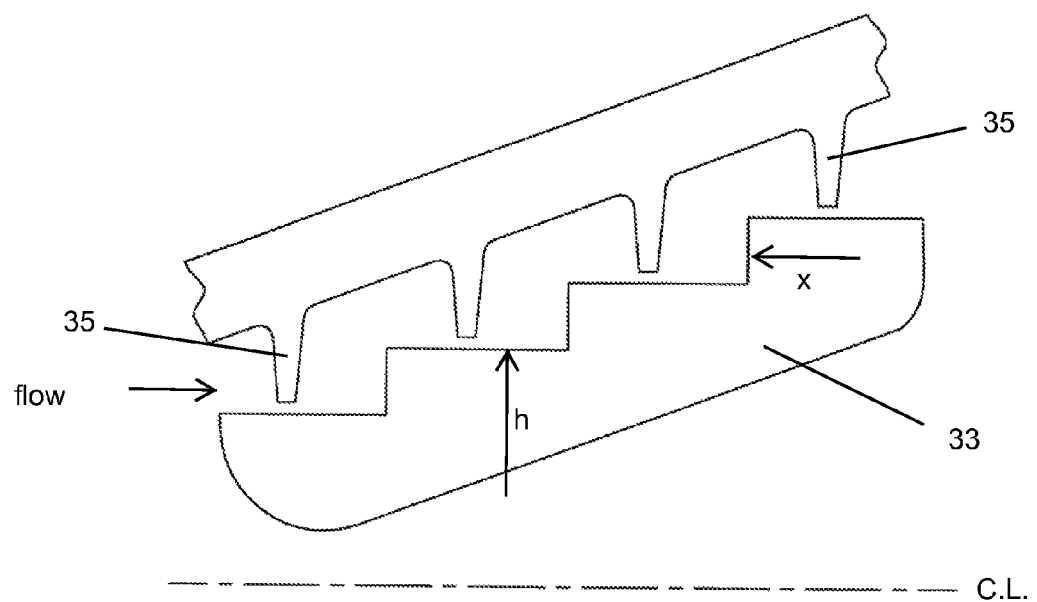
FIG. 7 shows a cross section view of a stepped labyrinth seal for a fourth embodiment of the present invention.
Figure 8:
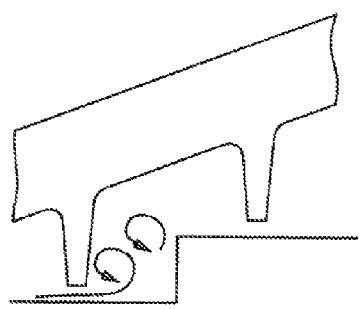
FIGS. 8 and 9 show a flow pattern for a stepped labyrinth seal with non-rounded corners compared to rounded corners using the labyrinth seal of FIG. 7.
Figure 9:
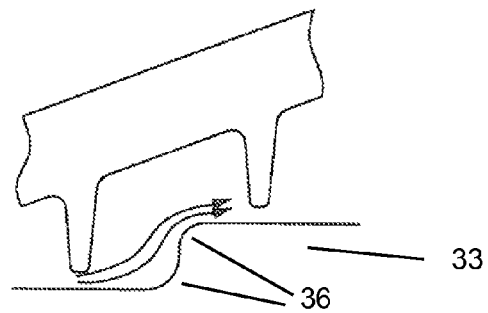
Figure 10:
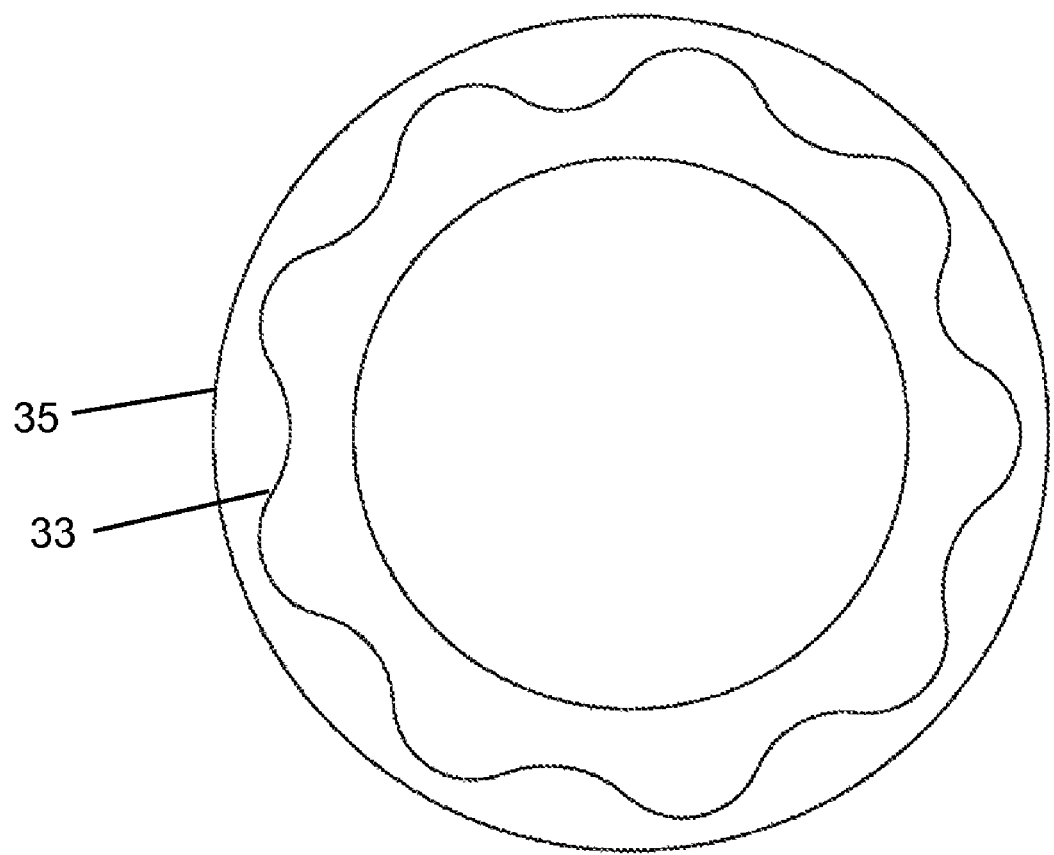
FIG. 10 shows a cross section view along the rotational axis of the stepped labyrinth seal of FIG. 7.

FIGS. 7-10 represent another embodiment of the present invention in which a stepped labyrinth seal includes the varying height or axial spacing to produce the same result as in the above embodiments. FIG. 7 shows a stepped labyrinth seal with a rotor 33 and a stator having a plurality of labyrinth teeth 35 with tips that form gaps with a surface of the stepped rotor 33. The lab teeth 35 can also be formed on a rotor while the steps 33 that form the gaps can be on a stator. A radial height (h) of each step will vary, either sinusoidal or random, so that the gap will vary. Each step of the rotor 33 also has an axial location from an adjacent lab tooth that can also vary, either sinusoidal or random, in order to accelerate the pressure drop and/or to accommodate transition to different radial locations in the turbomachine. FIG. 10 shows a cross section of one of the lab teeth of the stepped lab seal of FIG. 7 with the varying gap or radial height (h) of the tooth 35 with respect to the step surface 33.

Another embodiment of the FIG. 7 stepped labyrinth seal is to round the corners of the steps in the rotor 33 as seen in FIG. 9. FIG. 8 shows the flow across the gaps in the stepped lab seal of FIG. 7. FIG. 9 shows the flow with the rounded corners. With the rounded corners of FIG. 9, the cavities edge-tone effects will be minimized.

The variation in the radial gap can be achieved by changing the radial height (h) of the individual steps, either sinusoidal or random. The variation in the axial spacing between the knife edges could be substituted by a sinusoidal or random variation of the axial location (x) of the steps. Machining the steps to the desired sinusoidal or random patterns is much easier to program on numerically controlled machines than by EDM. A stepped labyrinth seal can have varying heights (h) and axial spacing (x) in the same design. Both can vary sinusoidal or random or a combination of sinusoidal and random.

The corner fillets will affect the acoustics in a beneficial way as well. The edge-tone phenomenon will be reduced, resulting in minimal interaction between the rotor and the stator parts of the lab seal.

We claim the following:

1. A labyrinth seal comprising:
   plurality of steps having a first labyrinth seal surface and a second labyrinth seal surface,
   a first tooth forming a first radial gap with the first labyrinth seal surface;
   a second tooth forming a second radial gap with the second labyrinth seal surface;
   a labyrinth seal cavity formed between the first tooth and second tooth; and,
   the first and second radial gaps both have a variable spacing such that the labyrinth seal will produce a variable flow rate across the radial gaps in the circumferential direction of the first and second teeth.

2. The labyrinth seal of claim 1, and further comprising:
   the variable spacing is either sinusoidal or random.

3. The labyrinth seal of claim 1, and further comprising:
   the first and second teeth are non-rotating teeth.

* * * * *